standard or brace *j* is keyed by a wooden or other key, so that the mold-board can be adjusted thereon. The upper edge of the mold-board, as at *h*, Fig. 2, stands off from the brace or standard *i*, so that the latter shall not obstruct the free passage of the furrow-slice over said mold-board.

*f* is an adjustable point or cutter, which is attached to the mold-board by a screw-bolt, *g*, or otherwise. The lower edge of the mold-board inclines upward, and is curved from point to heel, as from *f* to *h* in Fig. 3, for the purpose of raising up and turning over the furrow-slice. If the soil is of such a nature as not to turn readily and leave the mold-board, a piece, *t*, may be inserted in the staple *u* on the back of the mold-board so as to extend beyond the mold-board and throw off the furrow-slice.

By this construction of cultivator, if combined with a seeding mechanism, plowing, cultivating, leveling, planting, and rolling may all be done by once going over the field.

Having thus fully described my invention, what I claim is—

1. In combination with a main frame supported on and carried by a drum, B, on one side, serving as a roller, and a wheel, C, on the opposite side, a hinged plow-frame, D, controlled by said main frame, substantially as described.

2. The combination of the pivoted levers E P with a horizontally-hinged tongue, O, so that the driver from his seat may change the line of draft and the direction of the machine, substantially as herein set forth.

3. The angularly-shaped brace *n*, for holding the mold-board to the brace at its upper portion, when it also admits of having the unobstructed space between the mold-board and the brace, as at *h*, for the purpose herein described.

4. Fastening the mold-board to the plow-frame by means of the cross-braces *i j*, brace *n*, and staple *m*, with its key, in the manner and for the purpose herein described.

5. The removable extension-piece *t*, in combination with the mold-board, for the purpose described.

J. B. TURNER.

Witnesses:
 EDW. I. ENO,
 AUGUSTE ENO.